(12) United States Patent
Roweth et al.

(10) Patent No.: US 11,899,596 B2
(45) Date of Patent: Feb. 13, 2024

(54) SYSTEM AND METHOD FOR FACILITATING DYNAMIC COMMAND MANAGEMENT IN A NETWORK INTERFACE CONTROLLER (NIC)

(71) Applicant: Hewlett Packard Enterprise Development LP, Houston, TX (US)

(72) Inventors: Duncan Roweth, Bristol (GB); Abdulla M. Bataineh, Vista, CA (US); Edwin L. Froese, Burnaby (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 166 days.

(21) Appl. No.: 17/594,610

(22) PCT Filed: Mar. 23, 2020

(86) PCT No.: PCT/US2020/024250
§ 371 (c)(1),
(2) Date: Oct. 24, 2021

(87) PCT Pub. No.: WO2020/236275
PCT Pub. Date: Nov. 26, 2020

(65) Prior Publication Data
US 2022/0245072 A1 Aug. 4, 2022

Related U.S. Application Data

(60) Provisional application No. 62/852,203, filed on May 23, 2019, provisional application No. 62/852,273, (Continued)

(51) Int. Cl.
*G06F 13/16* (2006.01)
*G06F 13/28* (2006.01)

(52) U.S. Cl.
CPC ...... *G06F 13/1642* (2013.01); *G06F 13/1673* (2013.01); *G06F 13/28* (2013.01);
(Continued)

(58) Field of Classification Search
CPC .................................................. G06F 13/1642
(Continued)

(56) References Cited

U.S. PATENT DOCUMENTS 4,807,118 A 2/1989 Lin et al.
5,138,615 A 8/1992 Lamport et al.
(Continued)

FOREIGN PATENT DOCUMENTS

CN 101729609 A 6/2010
CN 102932203 A 2/2013
(Continued)

OTHER PUBLICATIONS

Ramakrishnan et al, RFC 3168, "The addition of Explicit Congestion Notification (ECN) to IP", Sep. 2001 (Year: 2001).
(Continued)

*Primary Examiner* — Titus Wong
(74) *Attorney, Agent, or Firm* — Yao Legal Services, Inc.

(57) ABSTRACT

A network interface controller (NIC) capable of efficient command management is provided. The NIC can be equipped with a host interface, an arbitration logic block, and a command management logic block. During operation, the host interface can couple the NIC to a host device. The arbitration logic block can select a command queue of the host device for obtaining a command. The command management logic block can determine whether an internal buffer associated with the command queue includes a command. If the internal buffer includes the command, the command management logic block can obtain the command from the internal buffer. On the other hand, if the internal
(Continued)

buffer is empty, the command management logic block can obtain the command from the command queue via the host interface.

20 Claims, 10 Drawing Sheets

Related U.S. Application Data filed on May 23, 2019, provisional application No. 62/852,289, filed on May 23, 2019.

(52) U.S. Cl.
CPC ............... *G06F 2213/0026* (2013.01); *G06F 2213/3808* (2013.01)

(58) Field of Classification Search
USPC ........................................................ 711/154
See application file for complete search history.

(56) References Cited

U.S. PATENT DOCUMENTS

| | | |
|---|---|---|
| 5,457,687 A | 10/1995 | Newman |
| 5,937,436 A | 8/1999 | Watkins |
| 5,960,178 A | 9/1999 | Cochinwala et al. |
| 5,970,232 A | 10/1999 | Passint et al. |
| 5,983,332 A | 11/1999 | Watkins |
| 6,112,265 A | 8/2000 | Harriman et al. |
| 6,230,252 B1 | 5/2001 | Passint et al. |
| 6,246,682 B1 | 6/2001 | Roy et al. |
| 6,424,591 B1* | 7/2002 | Yu .................... G06F 13/385 365/230.09 |
| 6,493,347 B2 | 12/2002 | Sindhu et al. |
| 6,545,981 B1 | 4/2003 | Garcia et al. |
| 6,633,580 B1 | 10/2003 | Toerudbakken et al. |
| 6,674,720 B1 | 1/2004 | Passint et al. |
| 6,714,553 B1 | 3/2004 | Poole et al. |
| 6,728,211 B1 | 4/2004 | Peris et al. |
| 6,732,212 B2 | 5/2004 | Sugahara et al. |
| 6,735,173 B1 | 5/2004 | Lenoski et al. |
| 6,894,974 B1 | 5/2005 | Aweya et al. |
| 7,023,856 B1 | 4/2006 | Washabaugh et al. |
| 7,133,940 B2 | 11/2006 | Blightman et al. |
| 7,218,637 B1 | 5/2007 | Best et al. |
| 7,269,180 B2 | 9/2007 | Bly et al. |
| 7,305,487 B2 | 12/2007 | Blumrich et al. |
| 7,337,285 B2 | 2/2008 | Tanoue |
| 7,397,797 B2 | 7/2008 | Alfieri et al. |
| 7,430,559 B2 | 9/2008 | Lomet |
| 7,441,006 B2 | 10/2008 | Biran et al. |
| 7,464,174 B1 | 12/2008 | Ngai |
| 7,483,442 B1 | 1/2009 | Torudbakken et al. |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Litwack |
| 8,103,788 B1 | 1/2012 | Miranda |
| 8,160,085 B2 | 4/2012 | Voruganti et al. |
| 8,175,107 B1 | 5/2012 | Yalagandula et al. |
| 8,249,072 B2 | 8/2012 | Sugumar et al. |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,650,582 B2 | 2/2014 | Archer et al. |
| 8,706,832 B2 | 4/2014 | Blocksome |
| 8,719,543 B2 | 5/2014 | Kaminski et al. |
| 8,811,183 B1 | 8/2014 | Anand et al. |
| 8,948,175 B2 | 2/2015 | Bly et al. |
| 8,971,345 B1 | 3/2015 | McCanne et al. |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,094,327 B2 | 7/2015 | Jacobs et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,864 B1 | 3/2016 | Pradeep |
| 9,436,651 B2 | 9/2016 | Underwood et al. |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Ilan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | McKelvie et al. |
| 10,169,060 B1 | 1/2019 | Vincent et al. |
| 10,178,035 B2 | 1/2019 | Dillon |
| 10,200,279 B1 | 2/2019 | Aljaedi |
| 10,218,634 B2 | 2/2019 | Aldebert et al. |
| 10,270,700 B2 | 4/2019 | Burnette et al. |
| 10,305,772 B2 | 5/2019 | Zur et al. |
| 10,331,590 B2 | 6/2019 | Macnamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,728,173 B1 | 7/2020 | Agrawal et al. |
| 10,802,828 B1 | 10/2020 | Volpe et al. |
| 10,817,502 B2 | 10/2020 | Talagala et al. |
| 11,128,561 B1 | 9/2021 | Matthews et al. |
| 11,271,869 B1 | 3/2022 | Agrawal et al. |
| 11,416,749 B2 | 8/2022 | Bshara et al. |
| 11,444,886 B1 | 9/2022 | Stawitzky et al. |
| 2001/0010692 A1 | 8/2001 | Sindhu et al. |
| 2001/0021949 A1* | 9/2001 | Blightman ............ H04L 69/163 370/254 |
| 2001/0047438 A1 | 11/2001 | Forin |
| 2002/0174279 A1 | 11/2002 | Wynne et al. |
| 2003/0016808 A1 | 1/2003 | Hu et al. |
| 2003/0041168 A1 | 2/2003 | Musoll |
| 2003/0110455 A1 | 6/2003 | Baumgartner et al. |
| 2003/0174711 A1 | 9/2003 | Shankar |
| 2003/0200363 A1 | 10/2003 | Futral |
| 2003/0223420 A1 | 12/2003 | Ferolito |

(56) References Cited

U.S. PATENT DOCUMENTS

| | | |
|---|---|---|
| 2004/0008716 A1 | 1/2004 | Stiliadis |
| 2004/0059828 A1 | 3/2004 | Hooper et al. |
| 2004/0062246 A1* | 4/2004 | Boucher .............. H04L 49/9073 |
| | | 709/236 |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |
| 2005/0152274 A1 | 7/2005 | Simpson |
| 2005/0177657 A1* | 8/2005 | Pope ...................... G06F 13/385 |
| | | 710/36 |
| 2005/0182854 A1 | 8/2005 | Pinkerton et al. |
| 2005/0193058 A1* | 9/2005 | Yasuda ................... G06F 3/067 |
| | | 711/112 |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0067347 A1 | 3/2006 | Naik et al. |
| 2006/0075480 A1 | 4/2006 | Noehring et al. |
| 2006/0174251 A1* | 8/2006 | Pope ........................ H04L 49/90 |
| | | 719/318 |
| 2006/0203728 A1 | 9/2006 | Kwan et al. |
| 2007/0061433 A1 | 3/2007 | Reynolds et al. |
| 2007/0070901 A1 | 3/2007 | Aloni et al. |
| 2007/0130356 A1* | 6/2007 | Boucher ................. H04L 67/62 |
| | | 709/230 |
| 2007/0198804 A1 | 8/2007 | Moyer |
| 2007/0211746 A1 | 9/2007 | Oshikiri et al. |
| 2007/0242611 A1 | 10/2007 | Archer et al. |
| 2007/0268825 A1 | 11/2007 | Corwin et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1 | 4/2008 | Moertl et al. |
| 2008/0147881 A1 | 6/2008 | Krishnamurthy et al. |
| 2008/0159138 A1 | 7/2008 | Shepherd et al. |
| 2008/0253289 A1 | 10/2008 | Naven et al. |
| 2009/0003212 A1 | 1/2009 | Kwan et al. |
| 2009/0010157 A1 | 1/2009 | Holmes et al. |
| 2009/0013175 A1 | 1/2009 | Elliott |
| 2009/0055496 A1 | 2/2009 | Garg et al. |
| 2009/0092046 A1 | 4/2009 | Naven et al. |
| 2009/0141621 A1 | 6/2009 | Fan et al. |
| 2009/0198958 A1 | 8/2009 | Arimilli et al. |
| 2009/0259713 A1 | 10/2009 | Blumrich et al. |
| 2009/0285222 A1 | 11/2009 | Hoover et al. |
| 2010/0061241 A1 | 3/2010 | Sindhu et al. |
| 2010/0169608 A1 | 7/2010 | Kuo et al. |
| 2010/0172260 A1 | 7/2010 | Kwan et al. |
| 2010/0183024 A1 | 7/2010 | Gupta |
| 2010/0220595 A1 | 9/2010 | Petersen |
| 2010/0274876 A1 | 10/2010 | Kagan et al. |
| 2010/0302942 A1 | 12/2010 | Shankar et al. |
| 2010/0316053 A1 | 12/2010 | Miyoshi et al. |
| 2011/0051724 A1 | 3/2011 | Scott et al. |
| 2011/0066824 A1 | 3/2011 | Bestler |
| 2011/0072179 A1 | 3/2011 | Lacroute et al. |
| 2011/0099326 A1 | 4/2011 | Jung et al. |
| 2011/0110383 A1* | 5/2011 | Yang ...................... H04L 49/901 |
| | | 370/463 |
| 2011/0128959 A1 | 6/2011 | Bando et al. |
| 2011/0158096 A1 | 6/2011 | Leung et al. |
| 2011/0158248 A1 | 6/2011 | Vorunganti et al. |
| 2011/0164496 A1 | 7/2011 | Loh et al. |
| 2011/0173370 A1 | 7/2011 | Jacobs et al. |
| 2011/0185370 A1* | 7/2011 | Tamir ................. H04L 41/0803 |
| | | 709/250 |
| 2011/0264822 A1 | 10/2011 | Ferguson et al. |
| 2011/0276699 A1 | 11/2011 | Pedersen |
| 2011/0280125 A1 | 11/2011 | Jayakumar |
| 2011/0320724 A1* | 12/2011 | Mejdrich ................ G06F 13/28 |
| | | 711/125 |
| 2012/0093505 A1 | 4/2012 | Yeap et al. |
| 2012/0102506 A1 | 4/2012 | Hopmann et al. |
| 2012/0117423 A1 | 5/2012 | Andrade et al. |
| 2012/0137075 A1 | 5/2012 | Vorbach |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0170462 A1 | 7/2012 | Sinha |
| 2012/0170575 A1 | 7/2012 | Mehra |
| 2012/0213118 A1 | 8/2012 | Lindsay et al. |
| 2012/0250512 A1 | 10/2012 | Jagadeeswaran et al. |
| 2012/0287821 A1 | 11/2012 | Godfrey et al. |
| 2012/0297083 A1 | 11/2012 | Ferguson et al. |
| 2012/0300669 A1 | 11/2012 | Zahavi |
| 2012/0314707 A1 | 12/2012 | Epps et al. |
| 2013/0010636 A1 | 1/2013 | Regula |
| 2013/0039169 A1 | 2/2013 | Schlansker et al. |
| 2013/0060944 A1 | 3/2013 | Archer et al. |
| 2013/0103777 A1 | 4/2013 | Kagan et al. |
| 2013/0121178 A1 | 5/2013 | Mainaud et al. |
| 2013/0136090 A1 | 5/2013 | Liu et al. |
| 2013/0182704 A1 | 7/2013 | Jacobs et al. |
| 2013/0194927 A1 | 8/2013 | Yamaguchi et al. |
| 2013/0203422 A1 | 8/2013 | Masputra et al. |
| 2013/0205002 A1 | 8/2013 | Wang et al. |
| 2013/0208593 A1 | 8/2013 | Nandagopal |
| 2013/0246552 A1 | 9/2013 | Underwood et al. |
| 2013/0290673 A1 | 10/2013 | Archer et al. |
| 2013/0301645 A1 | 11/2013 | Bogdanski et al. |
| 2013/0304988 A1 | 11/2013 | Totolos et al. |
| 2013/0311525 A1 | 11/2013 | Neerincx et al. |
| 2013/0326083 A1* | 12/2013 | Boucher ............. H04L 47/6225 |
| | | 709/232 |
| 2013/0329577 A1 | 12/2013 | Suzuki et al. |
| 2013/0336164 A1 | 12/2013 | Yang et al. |
| 2014/0019661 A1 | 1/2014 | Hormuth et al. |
| 2014/0032695 A1 | 1/2014 | Michels et al. |
| 2014/0036680 A1 | 2/2014 | Lih et al. |
| 2014/0064082 A1 | 3/2014 | Yeung et al. |
| 2014/0095753 A1 | 4/2014 | Crupnicoff et al. |
| 2014/0098675 A1 | 4/2014 | Frost et al. |
| 2014/0119367 A1 | 5/2014 | Han et al. |
| 2014/0122560 A1 | 5/2014 | Ramey et al. |
| 2014/0129664 A1 | 5/2014 | McDaniel et al. |
| 2014/0133292 A1 | 5/2014 | Yamatsu et al. |
| 2014/0136646 A1 | 5/2014 | Tamir et al. |
| 2014/0169173 A1 | 6/2014 | Naouri et al. |
| 2014/0185621 A1 | 7/2014 | Decusatis et al. |
| 2014/0189174 A1 | 7/2014 | Ajanovic et al. |
| 2014/0207881 A1 | 7/2014 | Nussle et al. |
| 2014/0211804 A1 | 7/2014 | Makikeni et al. |
| 2014/0226488 A1 | 8/2014 | Shamis et al. |
| 2014/0241164 A1 | 8/2014 | Cociglio et al. |
| 2014/0258438 A1* | 9/2014 | Ayoub .................... G06F 13/28 |
| | | 709/212 |
| 2014/0301390 A1 | 10/2014 | Scott et al. |
| 2014/0307554 A1 | 10/2014 | Basso et al. |
| 2014/0325013 A1 | 10/2014 | Tamir et al. |
| 2014/0328172 A1 | 11/2014 | Kumar et al. |
| 2014/0347997 A1 | 11/2014 | Bergamasco et al. |
| 2014/0362698 A1 | 12/2014 | Arad |
| 2014/0369360 A1 | 12/2014 | Carlstrom |
| 2014/0379847 A1 | 12/2014 | Williams |
| 2015/0003247 A1 | 1/2015 | Mejia et al. |
| 2015/0006849 A1 | 1/2015 | Xu et al. |
| 2015/0009823 A1 | 1/2015 | Ganga et al. |
| 2015/0026361 A1 | 1/2015 | Matthews et al. |
| 2015/0029848 A1 | 1/2015 | Jain |
| 2015/0055476 A1 | 2/2015 | Decusatis et al. |
| 2015/0055661 A1 | 2/2015 | Boucher et al. |
| 2015/0067095 A1 | 3/2015 | Gopal et al. |
| 2015/0089495 A1 | 3/2015 | Persson et al. |
| 2015/0103667 A1 | 4/2015 | Elias et al. |
| 2015/0124826 A1 | 5/2015 | Edsall et al. |
| 2015/0146527 A1 | 5/2015 | Kishore et al. |

(56) References Cited

U.S. PATENT DOCUMENTS

| | | |
|---|---|---|
| 2015/0154004 A1 | 6/2015 | Aggarwal |
| 2015/0161064 A1 | 6/2015 | Pope |
| 2015/0180782 A1 | 6/2015 | Rimmer et al. |
| 2015/0186318 A1 | 7/2015 | Kim et al. |
| 2015/0193262 A1 | 7/2015 | Archer et al. |
| 2015/0195388 A1 | 7/2015 | Snyder et al. |
| 2015/0208145 A1 | 7/2015 | Parker et al. |
| 2015/0220449 A1 | 8/2015 | Stark et al. |
| 2015/0237180 A1 | 8/2015 | Swartzentruber et al. |
| 2015/0244617 A1 | 8/2015 | Nakil et al. |
| 2015/0244804 A1 | 8/2015 | Warfield et al. |
| 2015/0261434 A1 | 9/2015 | Kagan et al. |
| 2015/0263955 A1 | 9/2015 | Talaski et al. |
| 2015/0263994 A1 | 9/2015 | Haramaty et al. |
| 2015/0288626 A1 | 10/2015 | Aybay |
| 2015/0365337 A1 | 12/2015 | Pannell |
| 2015/0370586 A1 | 12/2015 | Cooper et al. |
| 2016/0006664 A1 | 1/2016 | Sabato et al. |
| 2016/0012002 A1 | 1/2016 | Arimilli et al. |
| 2016/0028613 A1 | 1/2016 | Haramaty et al. |
| 2016/0065455 A1 | 3/2016 | Wang et al. |
| 2016/0094450 A1 | 3/2016 | Ghanwani et al. |
| 2016/0134518 A1 | 5/2016 | Callon et al. |
| 2016/0134535 A1 | 5/2016 | Callon |
| 2016/0134559 A1 | 5/2016 | Abel et al. |
| 2016/0134573 A1 | 5/2016 | Gagliardi et al. |
| 2016/0142318 A1 | 5/2016 | Beecroft |
| 2016/0154756 A1 | 6/2016 | Dodson et al. |
| 2016/0182383 A1 | 6/2016 | Pedersen |
| 2016/0205023 A1 | 7/2016 | Janardhanan |
| 2016/0226797 A1 | 8/2016 | Aravinthan et al. |
| 2016/0254991 A1 | 9/2016 | Eckert et al. |
| 2016/0259394 A1 | 9/2016 | Ragavan |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0344620 A1 | 11/2016 | Santos et al. |
| 2016/0381189 A1 | 12/2016 | Caulfield et al. |
| 2017/0024263 A1 | 1/2017 | Verplanken |
| 2017/0039063 A1 | 2/2017 | Gopal et al. |
| 2017/0041239 A1 | 2/2017 | Goldenberg et al. |
| 2017/0048144 A1 | 2/2017 | Liu |
| 2017/0054633 A1 | 2/2017 | Underwood et al. |
| 2017/0091108 A1 | 3/2017 | Arellano et al. |
| 2017/0097840 A1 | 4/2017 | Bridgers |
| 2017/0103108 A1 | 4/2017 | Datta et al. |
| 2017/0118090 A1 | 4/2017 | Pettit et al. |
| 2017/0118098 A1 | 4/2017 | Littlejohn et al. |
| 2017/0149920 A1* | 5/2017 | Sammatshetti ......... G06F 3/061 |
| 2017/0153852 A1 | 6/2017 | Ma et al. |
| 2017/0177541 A1 | 6/2017 | Berman et al. |
| 2017/0220500 A1 | 8/2017 | Tong |
| 2017/0237654 A1 | 8/2017 | Turner et al. |
| 2017/0237671 A1 | 8/2017 | Rimmer et al. |
| 2017/0242753 A1 | 8/2017 | Sherlock et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Lissack |
| 2017/0272370 A1 | 9/2017 | Ganga et al. |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Xu et al. |
| 2017/0371778 A1 | 12/2017 | McKelvie et al. |
| 2018/0004705 A1 | 1/2018 | Menachem et al. |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0150374 A1 | 5/2018 | Ratcliff |
| 2018/0152317 A1 | 5/2018 | Chang et al. |
| 2018/0152357 A1 | 5/2018 | Natham et al. |
| 2018/0173557 A1 | 6/2018 | Nakil et al. |
| 2018/0183724 A1 | 6/2018 | Callard et al. |
| 2018/0191609 A1 | 7/2018 | Caulfield et al. |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219804 A1 | 8/2018 | Graham et al. |
| 2018/0225238 A1 | 8/2018 | Karguth et al. |
| 2018/0234343 A1 | 8/2018 | Zdornov et al. |
| 2018/0254945 A1 | 9/2018 | Bogdanski et al. |
| 2018/0260324 A1 | 9/2018 | Marathe et al. |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2019/0007349 A1 | 1/2019 | Wang et al. |
| 2019/0018808 A1 | 1/2019 | Beard et al. |
| 2019/0036771 A1 | 1/2019 | Sharpless et al. |
| 2019/0042337 A1 | 2/2019 | Dinan et al. |
| 2019/0042518 A1 | 2/2019 | Marolia |
| 2019/0044809 A1 | 2/2019 | Willis et al. |
| 2019/0044827 A1 | 2/2019 | Ganapathi et al. |
| 2019/0044863 A1 | 2/2019 | Mula et al. |
| 2019/0044872 A1 | 2/2019 | Ganapathi et al. |
| 2019/0044875 A1 | 2/2019 | Murty et al. |
| 2019/0052327 A1 | 2/2019 | Motozuka et al. |
| 2019/0058663 A1 | 2/2019 | Song |
| 2019/0068501 A1 | 2/2019 | Schneider et al. |
| 2019/0081903 A1 | 3/2019 | Kobayashi et al. |
| 2019/0095134 A1 | 3/2019 | Li |
| 2019/0104057 A1 | 4/2019 | Goel et al. |
| 2019/0104206 A1 | 4/2019 | Goel et al. |
| 2019/0108106 A1 | 4/2019 | Aggarwal et al. |
| 2019/0108332 A1 | 4/2019 | Glew et al. |
| 2019/0109791 A1 | 4/2019 | Mehra et al. |
| 2019/0121781 A1 | 4/2019 | Kasichainula |
| 2019/0140979 A1 | 5/2019 | Levi et al. |
| 2019/0146477 A1 | 5/2019 | Cella et al. |
| 2019/0171612 A1 | 6/2019 | Shahar et al. |
| 2019/0196982 A1 | 6/2019 | Rozas et al. |
| 2019/0199646 A1 | 6/2019 | Singh et al. |
| 2019/0253354 A1 | 8/2019 | Caulfield et al. |
| 2019/0280978 A1 | 9/2019 | Schmatz et al. |
| 2019/0294575 A1 | 9/2019 | Dennison et al. |
| 2019/0306134 A1 | 10/2019 | Shanbhogue et al. |
| 2019/0332314 A1 | 10/2019 | Zhang et al. |
| 2019/0334624 A1 | 10/2019 | Bernard |
| 2019/0356611 A1 | 11/2019 | Das et al. |
| 2019/0361728 A1 | 11/2019 | Kumar et al. |
| 2019/0379610 A1 | 12/2019 | Srinivasan et al. |
| 2020/0036644 A1 | 1/2020 | Belogolovy et al. |
| 2020/0084150 A1 | 3/2020 | Burstein et al. |
| 2020/0145725 A1 | 5/2020 | Eberle et al. |
| 2020/0177505 A1 | 6/2020 | Li |
| 2020/0177521 A1 | 6/2020 | Blumrich et al. |
| 2020/0259755 A1 | 8/2020 | Wang et al. |
| 2020/0272579 A1 | 8/2020 | Humphrey et al. |
| 2020/0274832 A1 | 8/2020 | Humphrey et al. |
| 2020/0334195 A1 | 10/2020 | Chen et al. |
| 2020/0349098 A1 | 11/2020 | Caulfield et al. |
| 2021/0081410 A1 | 3/2021 | Chavan et al. |
| 2021/0152494 A1 | 5/2021 | Johnsen et al. |
| 2021/0263779 A1 | 8/2021 | Haghighat et al. |
| 2021/0334206 A1 | 10/2021 | Colgrove et al. |
| 2021/0377156 A1 | 12/2021 | Michael et al. |
| 2021/0409351 A1 | 12/2021 | Das et al. |
| 2022/0131768 A1 | 4/2022 | Ganapathi et al. |
| 2022/0166705 A1 | 5/2022 | Froese |
| 2022/0200900 A1 | 6/2022 | Roweth |
| 2022/0210058 A1 | 6/2022 | Bataineh et al. |
| 2022/0217078 A1 | 7/2022 | Ford et al. |

(56) References Cited

U.S. PATENT DOCUMENTS

| | | | |
|---|---|---|---|
| 2022/0217101 | A1 | 7/2022 | Yefet et al. |
| 2022/0278941 | A1 | 9/2022 | Shalev et al. |
| 2022/0309025 | A1 | 9/2022 | Chen et al. |
| 2023/0035420 | A1 | 2/2023 | Sankaran et al. |
| 2023/0046221 | A1 | 2/2023 | Pismenny et al. |

FOREIGN PATENT DOCUMENTS

| | | | |
|---|---|---|---|
| CN | 110324249 | A | 10/2019 |
| CN | 110601888 | A | 12/2019 |
| EP | 0275135 | A2 | 7/1988 |
| EP | 2187576 | A1 | 5/2010 |
| EP | 2219329 | A1 | 8/2010 |
| EP | 2947832 | A1 | 11/2015 |
| EP | 3445006 | A1 | 2/2019 |
| JP | 2003-244196 | A | 8/2003 |
| JP | 3459653 | B2 | 10/2003 |
| KR | 10-2012-0062864 | A | 6/2012 |
| KR | 10-2012-0082739 | A | 7/2012 |
| KR | 10-2014-0100529 | A | 8/2014 |
| KR | 10-2015-0026939 | A | 3/2015 |
| KR | 10-2015-0104056 | A | 9/2015 |
| KR | 10-2017-0110106 | A | 10/2017 |
| KR | 10-1850749 | B1 | 4/2018 |
| WO | 2001/069851 | A2 | 9/2001 |
| WO | 02/47329 | A2 | 6/2002 |
| WO | 2003/019861 | A2 | 3/2003 |
| WO | 2004/001615 | A1 | 12/2003 |
| WO | 2005/094487 | A2 | 10/2005 |
| WO | 2007/034184 | A2 | 3/2007 |
| WO | 2009/010461 | A2 | 1/2009 |
| WO | 2009/018232 | A1 | 2/2009 |
| WO | 2014/092780 | A1 | 6/2014 |
| WO | 2014/137382 | A1 | 9/2014 |
| WO | 2014/141005 | A1 | 9/2014 |
| WO | 2018/004977 | A1 | 1/2018 |
| WO | 2018/046703 | A1 | 3/2018 |
| WO | 2019/072072 | A1 | 4/2019 |

OTHER PUBLICATIONS

Extended European Search Report and Search Opinion received for EP Application No. 20809930.9, dated Mar. 2, 2023, 9 pages.
Extended European Search Report and Search Opinion received for EP Application No. 20810784.7, dated Mar. 9, 2023, 7 pages.
International Search Report and Written Opinion received for PCT Patent Application No. PCT/US20/24340, dated Oct. 26, 2020, 9 pages.
International Search Report and Written Opinion received for PCT Patent Application No. PCT/US20/24342, dated Oct. 27, 2020, 10 pages.
International Search Report and Written Opinion received for PCT Patent Application No. PCT/US2020/024192, dated Oct. 23, 2020, 9 pages.
International Search Report and Written Opinion received for PCT Patent Application No. PCT/US2020/024221, dated Oct. 26, 2020, 9 pages.
International Search Report cited in PCT/US2020/024170 dated Dec. 16, 2020; 3 pages.
Maabi, S., et al.; "ERFAN: Efficient reconfigurable fault-tolerant deflection routing algorithm for 3-D Network-on-Chip"; Sep. 6-9, 2016.
Maglione-Mathey, G., et al.; "Scalable Deadlock-Free Deterministic Minimal-Path Routing Engine for InfiniBand-Based Dragonfly Networks"; Aug. 21, 2017; 15 pages.
Mamidala, A.R., et al.; "Efficient Barrier and Allreduce on Infiniband clusters using multicast and adaptive algorithms"; Sep. 20-23, 2004; 10 pages.
Mammeri, Z; "Reinforcement Learning Based Routing in Networks: Review and Classification of Approaches"; Apr. 29, 2019; 35 pages.
Mollah; M. A., et al.; "High Performance Computing Systems. Performance Modeling, Benchmarking, and Simulation: 8th International Workshop"; Nov. 13, 2017.
Open Networking Foundation; "OpenFlow Switch Specification"; Mar. 26, 2015; 283 pages.
Prakash, P., et al.; "The TCP Outcast Problem: Exposing Unfairness in Data Center Networks"; 2011; 15 pages.
Ramakrishnan, K., et al.; "The Addition of Explicit Congestion Notification (ECN) to IP"; Sep. 2001; 63 pages.
Roth, P. C., et al.; "MRNet: A Software-Based Multicast/Reduction Network for Scalable Tools1"; Nov. 15-21, 2003; 16 pages.
Silveira, J., et al.; "Preprocessing of Scenarios for Fast and Efficient Routing Reconfiguration in Fault-Tolerant NoCs"; Mar. 4-6, 2015.
Tsunekawa, K.; "Fair bandwidth allocation among LSPs for AF class accommodating TCP and UDP traffic in a Diffserv-capable MPLS network"; Nov. 17, 2005; 9 pages.
Underwood, K.D., et al.; "A hardware acceleration unit for MPI queue processing"; Apr. 18, 2005; 10 pages.
Wu, J.; "Fault-tolerant adaptive and minimal routing in mesh-connected multicomputers using extended safety levels"; Feb. 2000; 11 pages.
Xiang, D., et al.; "Fault-Tolerant Adaptive Routing in Dragonfly Networks"; Apr. 12, 2017; 15 pages.
Xiang, D., et al; "Deadlock-Free Broadcast Routing in Dragonfly Networks without Virtual Channels", submission to IEEE transactions on Parallel and Distributed Systems, 2015, 15 pages.
Awerbuch, B., et al.; "An On-Demand Secure Routing Protocol Resilient to Byzantine Failures"; Sep. 2002; 10 pages.
Belayneh L.W., et al.; "Method and Apparatus for Routing Data in an Inter-Nodal Communications Lattice of a Massively Parallel Computer System by Semi-Randomly Varying Routing Policies for Different Packets"; 2019; 3 pages.
Bhatele, A., et al.; "Analyzing Network Health and Congestion in Dragonfly-based Supercomputers"; May 23-27, 2016; 10 pages.
Blumrich, M.A., et al.; "Exploiting Idle Resources in a High-Radix Switch for Supplemental Storage"; Nov. 2018; 13 pages.
Chang, F., et al.; "PVW: Designing Vir PVW: Designing Virtual World Ser orld Server Infr er Infrastructur astructure"; 2010; 8 pages.
Chang, F., et al; "PVW: Designing Virtual World Server Infrastructure"; 2010; 8 pages.
Chen, F., et al.; "Requirements for RoCEv3 Congestion Management"; Mar. 21, 2019; 8 pages.
Cisco Packet Tracer; "packet-tracer;—ping"; https://www.cisco.com/c/en/us/td/docs/security/asa/asa-command-reference/I-R/cmdref2/p1.html; 2017.
Cisco; "Understanding Rapid Spanning Tree Protocol (802.1w)"; Aug. 1, 2017; 13 pages.
Eardley, Ed, P; "Pre-Congestion Notification (PCN) Architecture"; Jun. 2009; 54 pages.
Escudero-Sahuquillo, J., et al.; "Combining Congested-Flow Isolation and Injection Throttling in HPC Interconnection Networks"; Sep. 13-16, 2011; 3 pages.
Hong, Y.; "Mitigating the Cost, Performance, and Power Overheads Induced by Load Variations in Multicore Cloud Servers"; Fall 2013; 132 pages.
Huawei; "The Lossless Network For Data Centers"; Nov. 7, 2017; 15 pages.
International Search Report and Written Opinion received for PCT Application No. PCT/US2020/024248, dated Jul. 8, 2020, 11 pages.
International Search Report and Written Opinion received for PCT Application No. PCT/US20/24332, dated Jul. 8, 2020, 13 pages.
International Search Report and Written Opinion received for PCT Application No. PCT/US20/24243, dated Jul. 9, 2020, 10 pages.
International Search Report and Written Opinion received for PCT Application No. PCT/US20/24253, dated Jul. 6, 2020, 12 pages.
International Search Report and Written Opinion received for PCT Application No. PCT/US20/24256, dated Jul. 7, 2020, 11 pages.
International Search Report and Written Opinion received for PCT Application No. PCT/US20/24257, dated Jul. 7, 2020, 10 pages.
International Search Report and Written Opinion received for PCT Application No. PCT/US20/24258, dated Jul. 7, 2020, 9 pages.

(56) References Cited

OTHER PUBLICATIONS

International Search Report and Written Opinion received for PCT Application No. PCT/US20/24259, dated Jul. 9, 2020, 13 pages.
International Search Report and Written Opinion received for PCT Application No. PCT/US20/24260, dated Jul. 7, 2020, 11 pages.
International Search Report and Written Opinion received for PCT Application No. PCT/US20/24268, dated Jul. 9, 2020, 11 pages.
International Search Report and Written Opinion received for PCT Application No. PCT/US20/24269, dated Jul. 9, 2020, 11 pages.
International Search Report and Written Opinion received for PCT Application No. PCT/US20/24339, dated Jul. 8, 2020, 11 pages.
International Search Report and Written Opinion received for PCT Application No. PCT/US2020/024125, dated Jul. 10, 2020, 5 pages.
International Search Report and Written Opinion received for PCT Application No. PCT/US2020/024129, dated Jul. 10, 2020, 11 pages.
International Search Report and Written Opinion received for PCT Application No. PCT/US2020/024237, dated Jul. 14, 2020, 5 pages.
International Search Report and Written Opinion received for PCT Application No. PCT/US2020/024239, dated Jul. 14, 2020, 11 pages.
International Search Report and Written Opinion received for PCT Application No. PCT/US2020/024241, dated Jul. 14, 2020, 13 pages.
International Search Report and Written Opinion received for PCT Application No. PCT/US2020/024242, dated Jul. 6, 2020, 11 pages.
International Search Report and Written Opinion received for PCT Application No. PCT/US2020/024244, dated Jul. 13, 2020, 10 pages.
International Search Report and Written Opinion received for PCT Application No. PCT/US2020/024245, dated Jul. 14, 2020, 11 pages.
International Search Report and Written Opinion received for PCT Application No. PCT/US2020/024246, dated Jul. 14, 2020, 10 pages.
International Search Report and Written Opinion received for PCT Application No. PCT/US2020/024254, dated Jul. 13, 2020, 10 pages.
International Search Report and Written Opinion received for PCT Application No. PCT/US2020/024262, dated Jul. 13, 2020, 10 pages.
International Search Report and Written Opinion received for PCT Application No. PCT/US2020/024266, dated Jul. 9, 2020, 10 pages.
International Search Report and Written Opinion received for PCT Application No. PCT/US2020/024270, dated Jul. 10, 2020, 13 pages.
International Search Report and Written Opinion received for PCT Application No. PCT/US2020/024271, dated Jul. 9, 2020, 10 pages.
International Search Report and Written Opinion received for PCT Application No. PCT/US2020/024272, dated Jul. 9, 2020, 10 pages.
International Search Report and Written Opinion received for PCT Application No. PCT/US2020/024276, dated Jul. 13, 2020, 9 pages.
International Search Report and Written Opinion received for PCT Application No. PCT/US2020/024304, dated Jul. 15, 2020, 11 pages.
International Search Report and Written Opinion received for PCT Application No. PCT/US2020/024311, dated Jul. 17, 2020, 8 pages.
International Search Report and Written Opinion received for PCT Application No. PCT/US2020/024321, dated Jul. 9, 2020, 9 pages.
International Search Report and Written Opinion received for PCT Application No. PCT/US2020/024324, dated Jul. 14, 2020, 10 pages.
International Search Report and Written Opinion received for PCT Application No. PCT/US2020/024327, dated Jul. 10, 2020, 15 pages.
International Search Report and Written Opinion received for PCT Application No. PCT/US2020/24158, dated Jul. 6, 2020, 18 pages.
International Search Report and Written Opinion received for PCT Application No. PCT/US2020/24251, dated Jul. 6, 2020, 11 pages.
International Search Report and Written Opinion received for PCT Application No. PCT/US2020/24267, dated Jul. 6, 2020, 9 pages.
International Search Report and Written Opinion received for PCT Patent Application No. PCT/US20/24303, dated Oct. 21, 2020, 9 pages.
International Search Report and Written Opinion received for PCT Application No. PCT/US2020/024250, dated Jul. 14, 2020, 12 pages.

* cited by examiner

SYSTEM AND METHOD FOR FACILITATING DYNAMIC COMMAND MANAGEMENT IN A NETWORK INTERFACE CONTROLLER (NIC)

BACKGROUND

Field

This is generally related to the technical field of networking. More specifically, this disclosure is related to systems and methods for facilitating a network interface controller (NIC) with efficient command management.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of efficient command management is provided. The NIC can be equipped with a host interface, an arbitration module, and a command management module. During operation, the host interface can couple the NIC to a host device. The arbitration module can select a command queue of the host device for obtaining a command. The command management module can determine whether an internal buffer associated with the command queue includes a command. If the internal buffer includes the command, the command management module can obtain the command from the internal buffer. On the other hand, if the internal buffer is empty, the command management module can obtain the command from the command queue via the host interface.

BRIEF DESCRIPTION OF THE FIGURES

In the figures, like reference numerals refer to the same figure elements.

DETAILED DESCRIPTION

Figure 1:
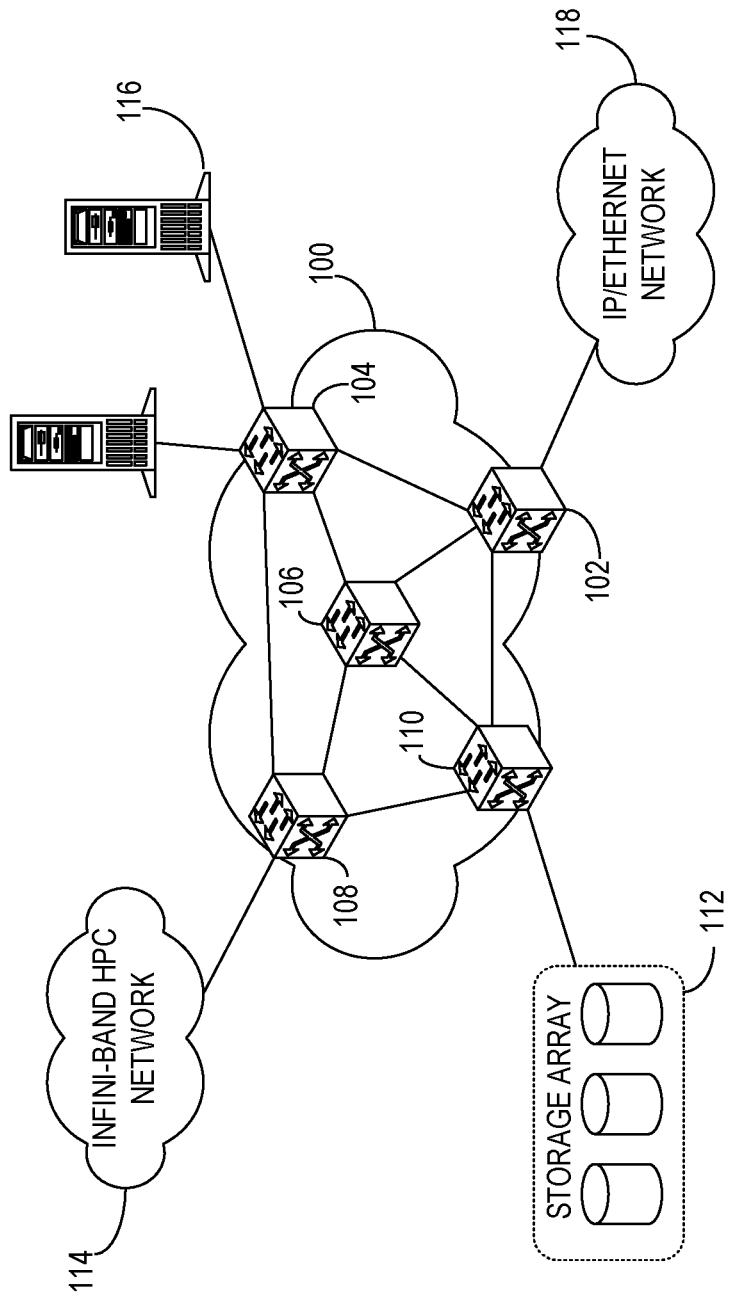
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

OVERVIEW

The present disclosure describes systems and methods that facilitate dynamic command management in a network interface controller (NIC). The NIC allows a host to communicate with a data-driven network.

The embodiments described herein solve the problem of efficiently transferring commands to a NIC by (i) facilitating a command queue in the host device and an internal command buffer in the NIC for large-scale and low-latency command transfers, respectively, and (ii) dynamically selecting between the command queue and internal buffer for receiving a command.

During operation, a host device of a NIC can issue a command for a data operation (e.g., a "GET" or a "PUT" command of remote direct memory access (RDMA)) to the NIC. Consequently, the host device can transfer the command (e.g., a direct memory access (DMA) descriptor of the command) to the NIC. If the host device needs to transfer a large number of commands to the NIC, the host device may store the commands in a command queue of the host device. The host device may maintain the command queue in the memory of the host device. When the NIC is ready for a new command (e.g., has available resources for the next command), the NIC can request the command from the host device. The processor of the host device can then transfer the command to the NIC.

This read-based approach is based on the NIC accessing the memory of the host device. Therefore, the read-based approach can be referred to as the memory-based command path. The memory-based command path can allow large-scale transfer to the NIC and facilitate efficient bandwidth utilization of the internal bandwidth of the host device. However, the memory-based command path can have high latency for the command transfer because the interface system (or processor interface) can be accessed multiple times for accessing the command.

To transfer a command with low latency, the host device may transfer commands associated with small amounts of data to an internal command buffer of the NIC. In some embodiments, the processor of the host device may write in the internal buffer of the NIC. This write-based approach can provide data transfer with low latency. Therefore, the write-based approach can be referred to as the low-latency command path. However, the low-latency command path can limit the volume of transfer since the internal buffer of the NIC can have limited capacity.

To solve this problem, the NIC can combine both approaches to facilitate an efficient transfer rate with low latency. The host device may maintain a command queue for a respective flow of commands (e.g., based on traffic class) in the memory of the host device. If an application issues a command for the NIC, the command can be stored in a corresponding command queue. The host device can then notify the NIC regarding the new command by advancing a write pointer. Since any application may write in the command queue, this approach can be independent of the application. The NIC can then issue a read operation to the command queue and advance a pre-fetch pointer of the queue. When the data is returned, the NIC can process the command and advance a read pointer.

However, if the command queue likely to be empty (i.e., any commands previously written to the command queue are known to have been, or are likely to have been processed by the NIC)), the host device may insert a command into the internal buffer of the NIC. The NIC may maintain an internal buffer for a respective command queue of the host device. The buffer can have a fixed size that may host a limited number of commands. Since the command can be directly written into the internal buffer, the NIC can avoid a round trip data exchange via the internal communication channel (e.g., a peripheral component interconnect express (PCIe) channel). In this way, the NIC can reduce the latency of issuing commands to the NIC. By dynamically switching between the command paths, the host device can select a command path that can efficiently transfer commands.

One embodiment of the present invention provides a NIC that can be equipped with a host interface, an arbitration logic block, and a command management logic block. During operation, the host interface can couple the NIC to a host device. The arbitration logic block can select a command queue of the host device for obtaining a command. The command management logic block can receive the command via the host interface and determine whether an internal buffer associated with the command queue includes a command. If the internal buffer includes the command, the command management logic block can obtain the command from the internal buffer. On the other hand, if the internal buffer is empty, the command management logic block can obtain the command from the command queue via the host interface.

In a variation on this embodiment, the command management logic block can provide the host device one or more of: (i) processing information associated with the internal buffer, and (ii) state information comprising a read pointer of the command queue.

In a variation on this embodiment, the command management logic block can determine that the command queue has a new command based on the advancement of a write pointer of the command queue.

In a variation on this embodiment, the arbitration logic block can select the command queue from a plurality of command queues in a memory of the host device.

In a further variation, the NIC can also include a corresponding internal buffer for a respective command queue.

In a variation on this embodiment, the command management logic block may drop a new command received from the host interface and destined for the internal buffer upon determining one or more of: (i) insufficient capacity in the internal buffer to accommodate the new command, and (ii) the command queue is not empty.

In a variation on this embodiment, in response to receiving the new command, the command management logic block can advance a write pointer of the command queue, thereby determining the presence of a command in the command queue.

In a variation on this embodiment, the command management logic block can advance a pre-fetch pointer of the command queue upon requesting the command and advance a read pointer of the command queue upon receiving data associated with the command.

In a variation on this embodiment, the host interface can be a peripheral component interconnect express (PCIe) interface. The command management logic block can then obtain the command from the command queue based on a PCIe read.

In a variation on this embodiment, the command can include an RDMA command.

One embodiment of the present invention provides a computer system that can include a memory device, a host interface, and a command management system. The memory device can store a command queue. The host interface can couple a NIC, which can maintain an internal buffer associated with the command queue. During operation, the system can write a command to the command queue and determine, based on states of the command queue, whether the internal buffer can accept the command. If the internal buffer can accept the command, the system can write, via the host interface, the command into the internal buffer. On the other hand, if the internal buffer cannot accept the command, the system can inform the NIC, via the host interface, that the command has been written into the command queue.

In a variation on this embodiment, the state of the command queue indicates whether the command queue is empty.

In a variation on this embodiment, the system can obtain statistics associated with the performance of the internal buffer and speculatively determine, based on the obtained statistics, whether the command queue is expected to be empty.

In a variation on this embodiment, informing the NIC can include advancing a write pointer of the command queue.

In a variation on this embodiment, the memory device can store a plurality of command queues.

In a variation on this embodiment, the system can write a plurality of commands into the command queue based on a granularity of allowed writes into the command queue. Subsequently, the system can advance a write pointer of the command queue according to the granularity.

In a variation on this embodiment, if the internal buffer cannot accept the command, the system can select the command in the command queue as a backup command.

In a further variation, the NIC can obtain the command from the command queue via the host interface if the command has been dropped at the internal buffer.

In a variation on this embodiment, the host interface can be a PCIe interface. The system can then write the command into the internal buffer based on a PCIe write.

In a variation on this embodiment, the command can include an RDMA command.

Figure 2A:
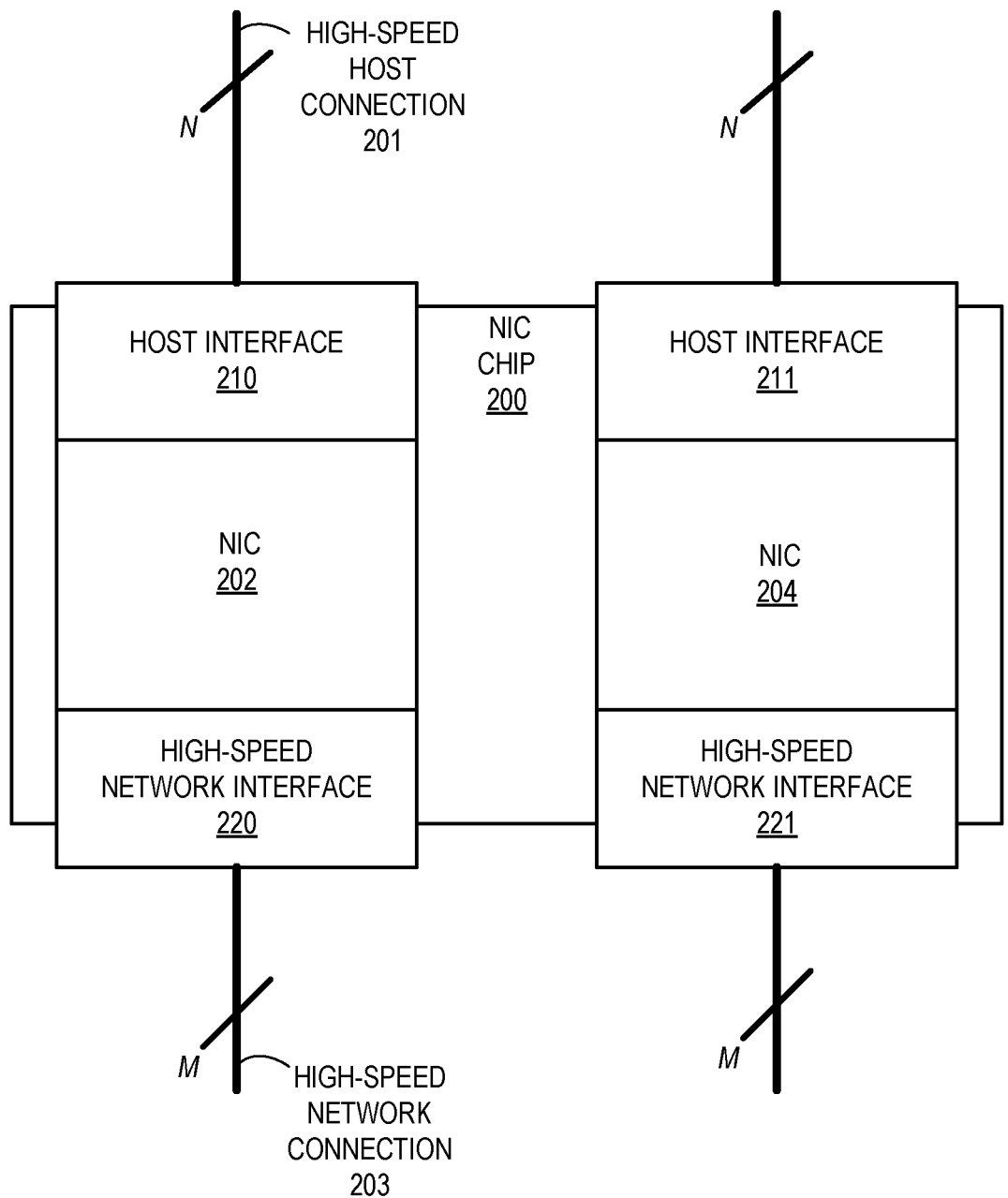
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient command management.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
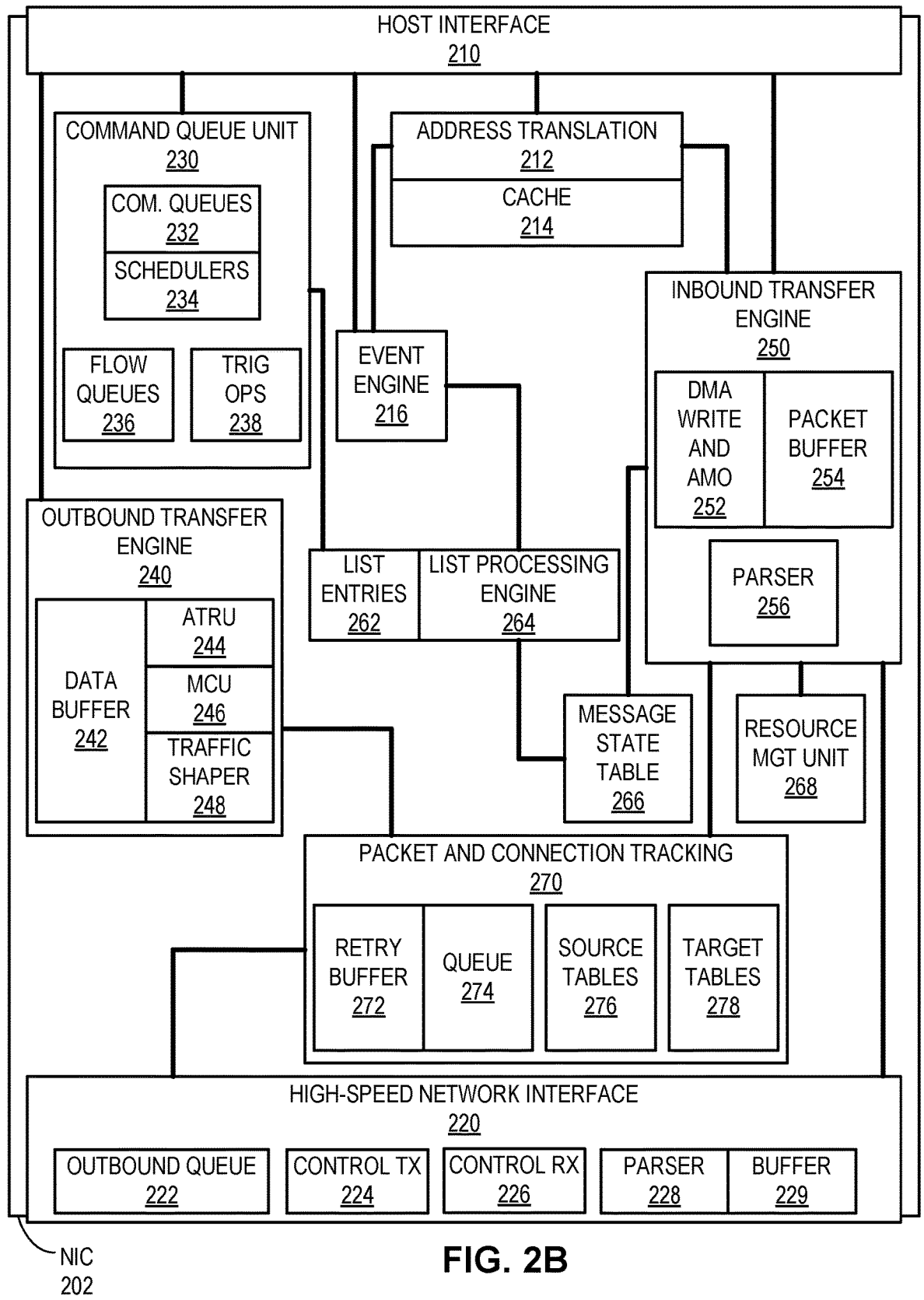
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands. CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be retrieved from retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. An event can be an internal control message for communication among the elements of NIC 202. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET request), the packet can be passed to the OXE 240. NIC 202 can also include an EE 216, which can receive requests to generate event notifications from other modules or units in NIC 202. An event notification can specify that either a full event or a counting event is generated. EE 216 can manage event queues, located within host processor memory, to which it writes full events. EE 216 can forward counting events to CQ unit 230.

Dynamic Command Management in NIC

Figure 3A:
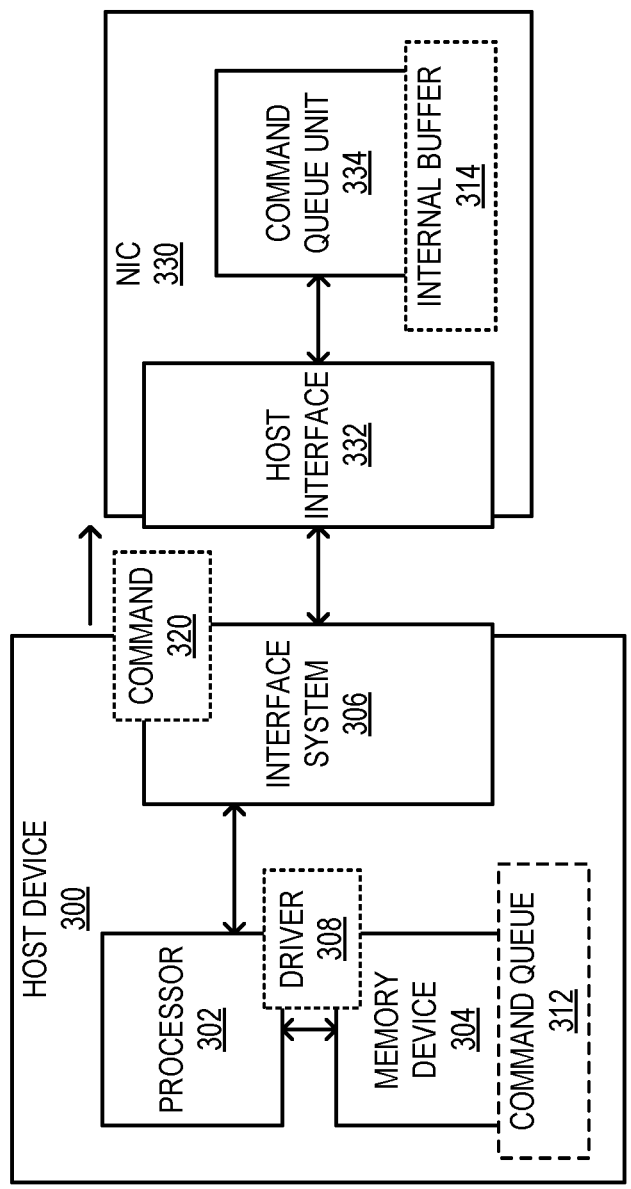
FIG. 3A shows an exemplary dynamic command management process in a NIC.

FIG. 3A shows an exemplary dynamic command management process in a NIC. In this example, a host device 300 can be equipped with a NIC 330. Device 300 can include a processor 302, a memory device 304, and an interface system 306. An HI 332 of NIC 330 can be coupled to interface system 306 of device 300. In some embodiments, HI 332 can be a PCIe interface, and interface system 306 can be a PCIe system that provides a slot for HI 332. NIC 330 can also include a command queue unit 334 for managing incoming commands from device 300, as described in conjunction with FIG. 2A.

During operation, device 300 can issue a command 320 for an operation (e.g., an RDMA operation). To transfer the command, host 300 may generate a descriptor of command (e.g., a DMA descriptor) and transfer command 320 to NIC 330. If command 320 is one of a large number of commands, device 300 can store command 320 in a command queue 312 in memory device 304. When NIC 330 has available resources for the next command, NIC 330 can request a command from device 300. If command 320 is the next command, processor 302 can transfer command 320 to NIC 330 via HI 332. Here, NIC 330 can read commands from memory device 304 of host 300. This memory-based command path can allow large-scale command transfer to NIC 300, thereby facilitating efficient bandwidth utilization of interface system 306.

However, the memory-based command path can have high latency for the command transfer because interface system 306 can be accessed multiple times for accessing command 320. Alternatively, if command 320 is associated with a small amount of data (e.g., within a threshold), device 300 may transfer command 320 to an internal command buffer 314 in NIC 330. In some embodiments, processor 302 may write in internal buffer 314. This low-latency command path can provide data transfer with low latency. However, the low-latency command path can limit the volume of transfer since internal buffer 314 can have limited capacity.

To solve this problem, NIC 330 can combine both command paths to facilitate an efficient transfer rate with low latency. Furthermore, device 300 may maintain a plurality of command queues, each for a respective flow of commands, in memory device 304. Command queue 312 can be one of the command queues. When an application running on device 300 issues command 320 for NIC 330, command 320 can be stored in command queue 312. Device 300 can then notify NIC 330 regarding command 320 by advancing a write pointer of command queue 312. NIC 330 can then issue a read operation to command queue 312 via HI 332 and advance a pre-fetch pointer of command queue 312. When the data is returned for command 320, NIC 330 can process command 320 and advance a read pointer of command queue 312.

However, if command queue 312 is empty, device 300 may insert command 320 into internal buffer 314. NIC 330 may maintain an internal buffer for a respective command queue of device 300. Internal buffer 314 can be managed by command queue unit 334. Internal buffer 314 can have a fixed size that may store a limited number of commands. Since command 320 can be directly written into internal buffer 314, NIC 330 can avoid a round trip data exchange with processor 302 via interface channel 306. In this way, internal buffer 314 can reduce the latency of issuing commands to NIC 330. By dynamically switching between command queue 312 and internal buffer 314, host 300 can select a command path that can efficiently transfer commands to NIC 330.

In some embodiments, a device driver 308 of NIC 330 running on the operating system of host 300 may select the command path. Driver 308 can dynamically determine whether to use the memory-based or low-latency command path for a respective command (i.e., on a command-by-command basis). Driver 308 may determine whether there is an outstanding command in command queue 312 and internal buffer 314 based on information from NIC 330. For example, NIC 330 can provide the current locations of one or more pointers of command queue 312 to driver 308. In addition, NIC 330 may also provide statistics on how effectively internal buffer 314 is used. Driver 308 can determine whether to select internal buffer 314 for transferring the next command.

Furthermore, driver 308 can speculatively determine that internal buffer 314 should have available capacity. Based on the determination, driver 308 may select internal buffer 314 for issuing a command if the current status of command queue 312 and internal buffer 314 meet the selection criteria. Otherwise, driver 308 may use command queue 312. Accordingly, NIC 330 can obtain a command from internal buffer 314 if possible. Otherwise, NIC 330 can obtain a command from command queue 312.

Figure 3B:
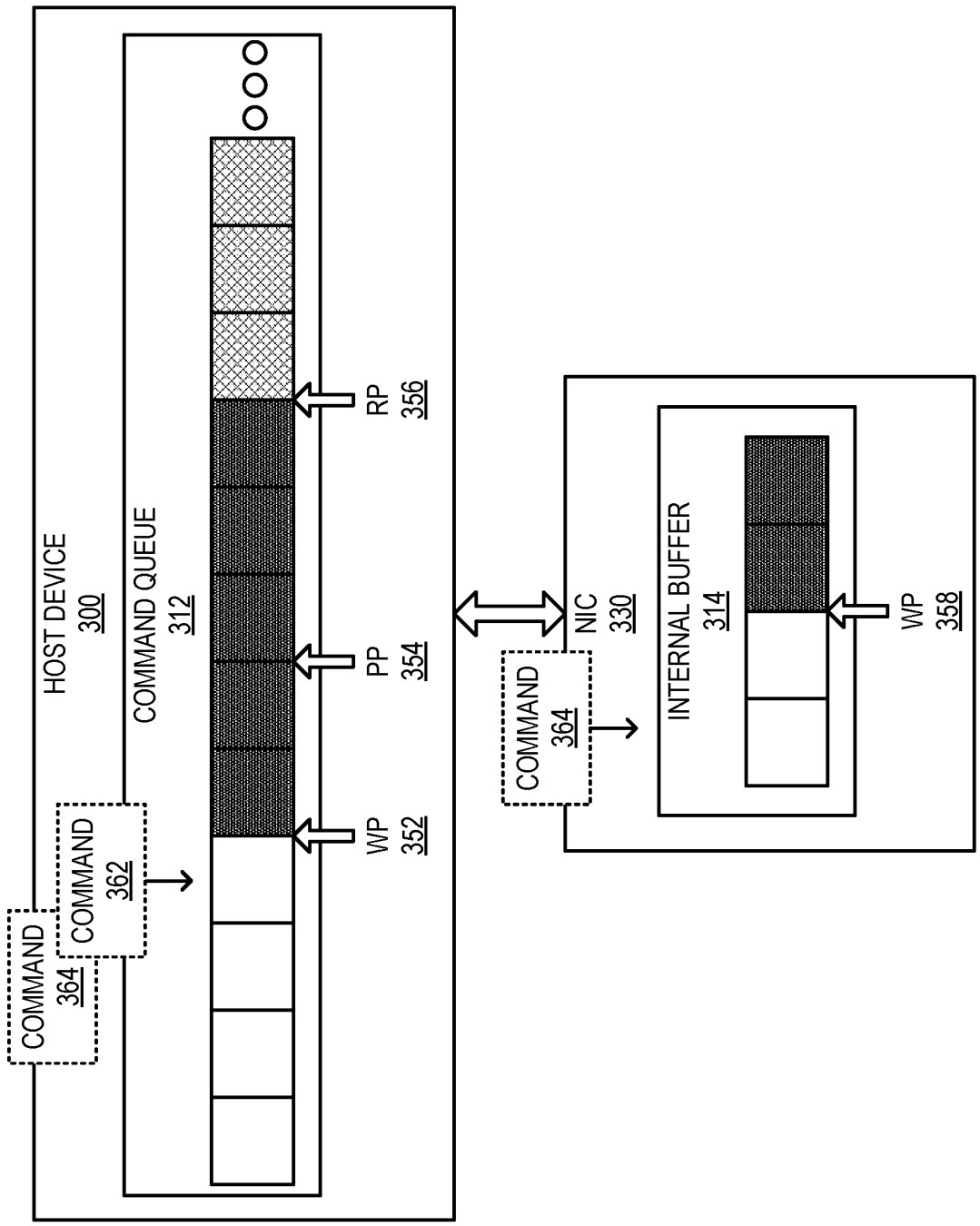
FIG. 3B shows exemplary queues for facilitating dynamic command management in a NIC.

FIG. 3B shows exemplary queues for facilitating dynamic command management in a NIC. The operations on command queue 312 can be based on the operations of a circular buffer. During operation, if device 300 determines that a command 362 should be issued to command queue 312, device 300 can format command 362. Device 300 can then store command 362 in command queue 312 at the location indicated by a write pointer 352. Device 300 can then advance write pointer 352 to the next memory location. Advancing write pointer 352 can trigger a notification (or a "doorbell") for NIC 330. Device 300 can write a plurality of commands to command queue 312 before advancing write pointer 352. In some embodiments, the granularity of advancing write pointer 352 can be configured at device 300 (e.g., by a user).

Based on the trigger, NIC 330 can determine that command queue 312 has a new command. If NIC 330 selects command queue 312 for processing (e.g., based on an arbitration process among the command queues), NIC 330 can read a command indicated by pre-fetch pointer 354 from command queue 312 and advance pre-fetch pointer 354. For example, if pre-fetch pointer 354 represents the location of command 362, NIC 330 can read command 362 from command queue 312. When the data associated with command 362 is returned to NIC 330, NIC 330 can process command 362 and advance a read pointer 356.

In some embodiments, advancing read pointer 356 can include updating an application-visible copy of read pointer 356 according to a queue-specific policy. NIC 330 can continue to read commands from command queue 312 until the processing resources (e.g., the execution units described in conjunction with FIG. 2B) of NIC 330 have sufficient commands to execute. NIC 330 may stop reading commands if pre-fetch pointer 354 reaches write pointer 352 (e.g., if command queue 312 is empty). Since command queue 312 can be circular queue with a fixed size, device 330 may pause issuing commands to command queue 312 if write pointer 352 reaches read pointer 356. Write pointer 352 reaching read pointer 356 can indicate that command queue 312 is full and cannot accept a new command. Pointers 352, 354, and 356 can indicate a location or position in command queue 312. For example, pointers 352, 354, and 356 can represent indices of command queue 312 (e.g., array indices) or memory pointers indicating memory locations.

On the other hand, device 300 may determine that a command 364 should be issued to internal buffer 314 if device 300 determines or speculates that command queue 312 is empty. Device 300 can then format command 364 and store command 364 in command queue 312 at the location indicated by a write pointer 352. However, device 300 may not advance write pointer 352 and instead, may write command 364 into internal buffer 364 if device 300 determines or speculates that internal buffer 314 has sufficient capacity to accommodate command 364. Device 300 may perform the write operation using a PCIe based write operation. A write memory barrier, such as an SFENCE instruction, can be used between the respective writes to command queue 312 and internal buffer 314.

Upon detecting the write operation in internal buffer 314, NIC 330 can advance write pointer 358. When NIC 330 selects command queue 312 for processing a command, NIC 330 determines that internal buffer 314 stores a command. Accordingly, NIC 330 reads from internal buffer 314 instead of issuing an interface-based read, such as PCIe read, to command queue 312. Upon obtaining command 364 from internal buffer 314, NIC 330 can advance pre-fetch pointer 354.

It should be noted that the write operations to internal buffer 314 may arrive out of order. Furthermore, the granularity of the write operations can be smaller than that of some commands. NIC 330 can track partial write operations to internal buffer 314 and advance write pointer 352 when the write operations within a block of internal buffer 314 have completed. If internal buffer 314 still includes data of a previous write operation, or command queue 312 has not been empty (i.e., pre-fetch pointer 354 has not been equal to write pointer 352) when operation 364 is issued, NIC 330 may drop command 364. Command 364 in command queue 312 can then operate as the backup command. When NIC 330 has available resources for executing another command, NIC 330 may obtain the next command from command queue 312.

Figure 4A:
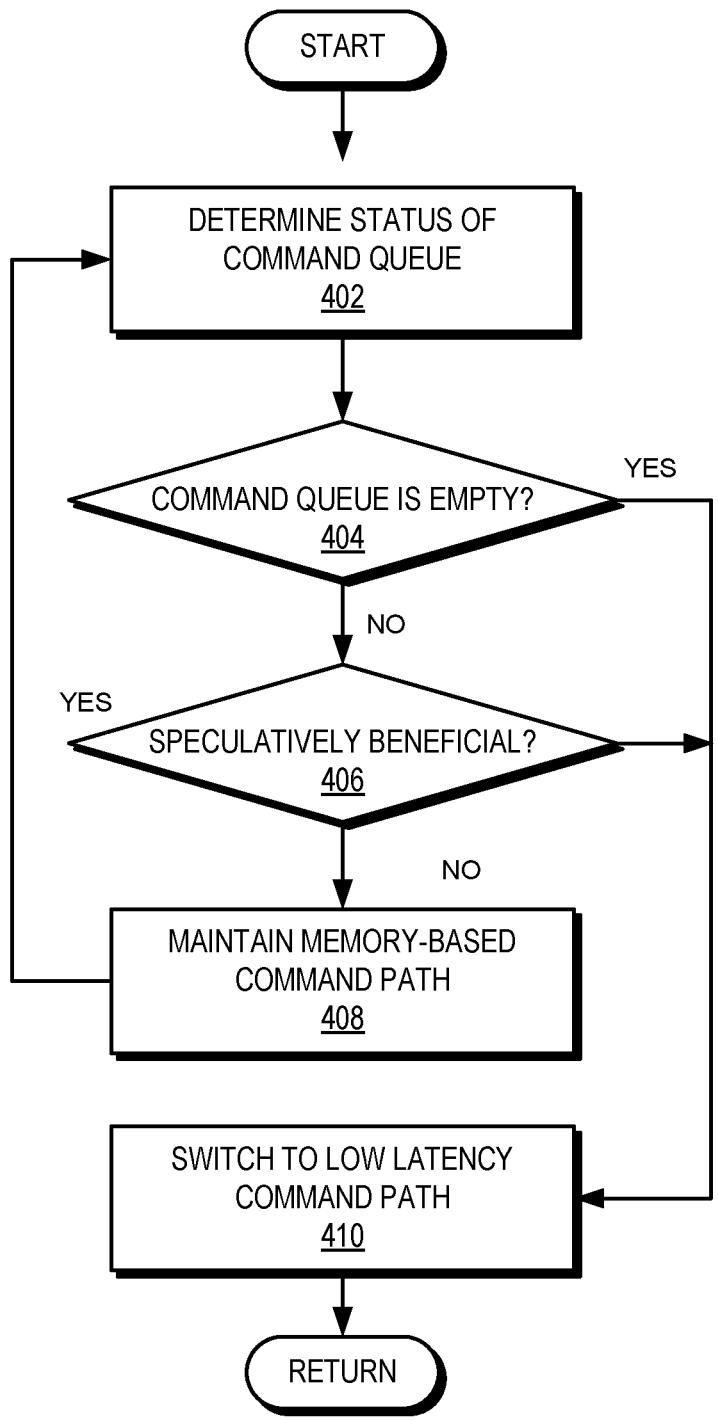
FIG. 4A shows a flow chart of a dynamic queue selection process for processing commands in a NIC.

FIG. 4A shows a flow chart of a dynamic queue selection process for processing commands in a NIC. During operation, the host device of the NIC can obtain the last-known status of the command queue (operation 402). The device can then determine whether the command queue is empty (operation 404). If the command queue is not empty, the device may determine whether issuing commands to the internal buffer is speculatively beneficial (operation 406). For example, if the command queue is likely to be empty, issuing commands to the internal buffer can be speculatively beneficial.

If issuing commands is not speculatively beneficial, the device can maintain memory-based command path (operation 408) and continue to obtain the status of the command queue (operation 402). On the other hand, if the command queue empty (operation 404) or issuing commands is speculatively beneficial (operation 406), the device can switch to the low-latency command path (operation 410). It should be noted that the memory-based command path can be the default option for the device. Unless switched to the low-latency command path, the device can continue to use the memory-based command path to transfer commands to the NIC.

Figure 4B:
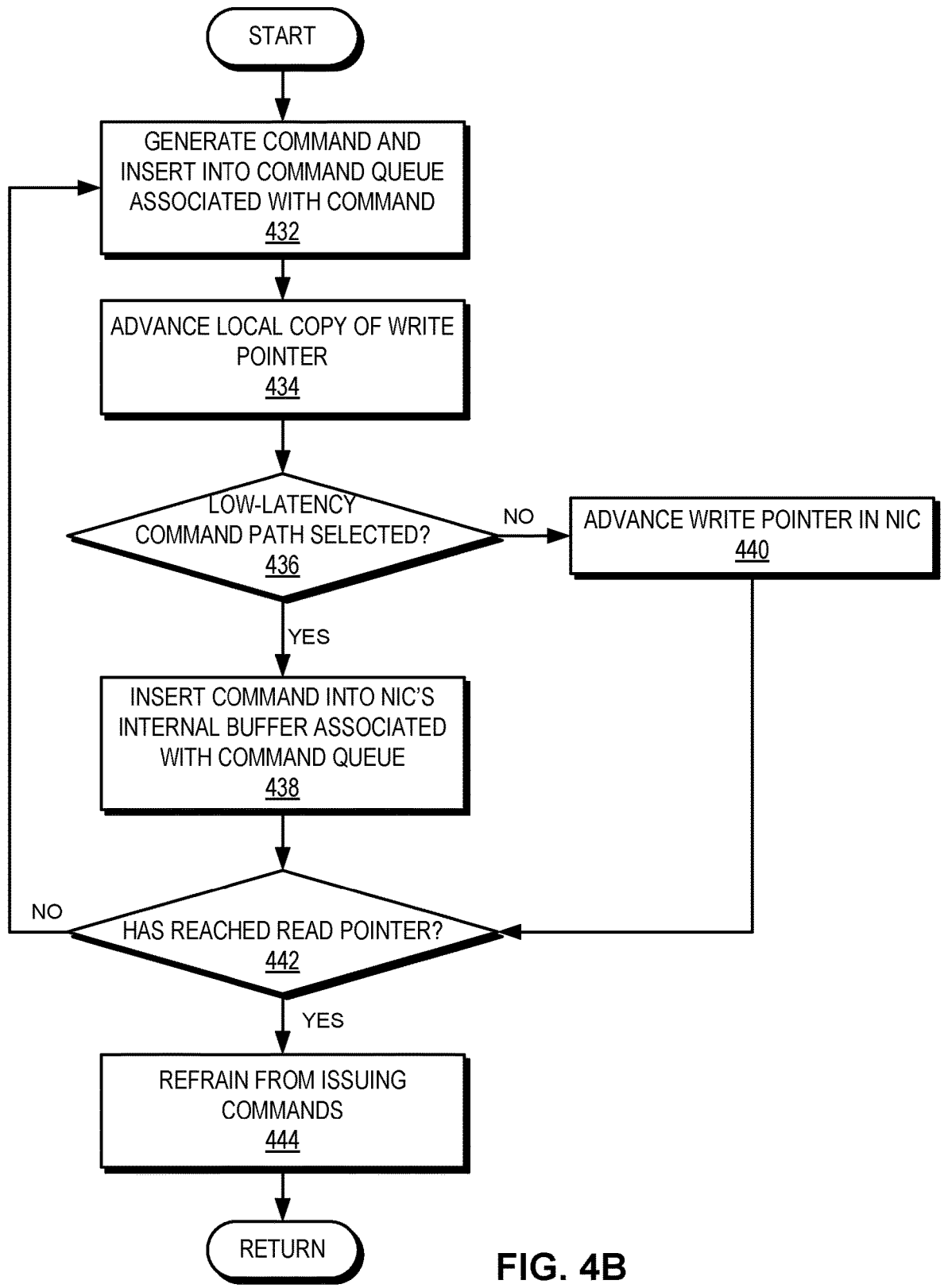
FIG. 4B shows a flow chart of a dynamic command management process of a host device.

FIG. 4B shows a flow chart of a dynamic command management process of a host device. During operation, the device can generate a command (e.g., in a format acceptable by a NIC of the device) and insert the command into a command queue associated with the command (operation 432), and advance the device's copy of the write pointer (operation 434). The device can then check whether the low-latency command path is selected (operation 436). If the low-latency command path is selected, the device can also insert the command into the NIC's internal buffer associated with the command queue (operation 438).

If the low-latency command path is not selected (operation 434), the device can advance the write pointer in the NIC (operation 440). The device can check whether the device's copy of the write pointer has reached the read pointer (operation 442). If the write pointer has not reached the read pointer, the device can continue to generate a command and insert the command into a command queue associated with the command (operation 432). However, if the write pointer has reached the read pointer, the command queue can be full, and the device can refrain from issuing more commands (operation 444).

Figure 4C:
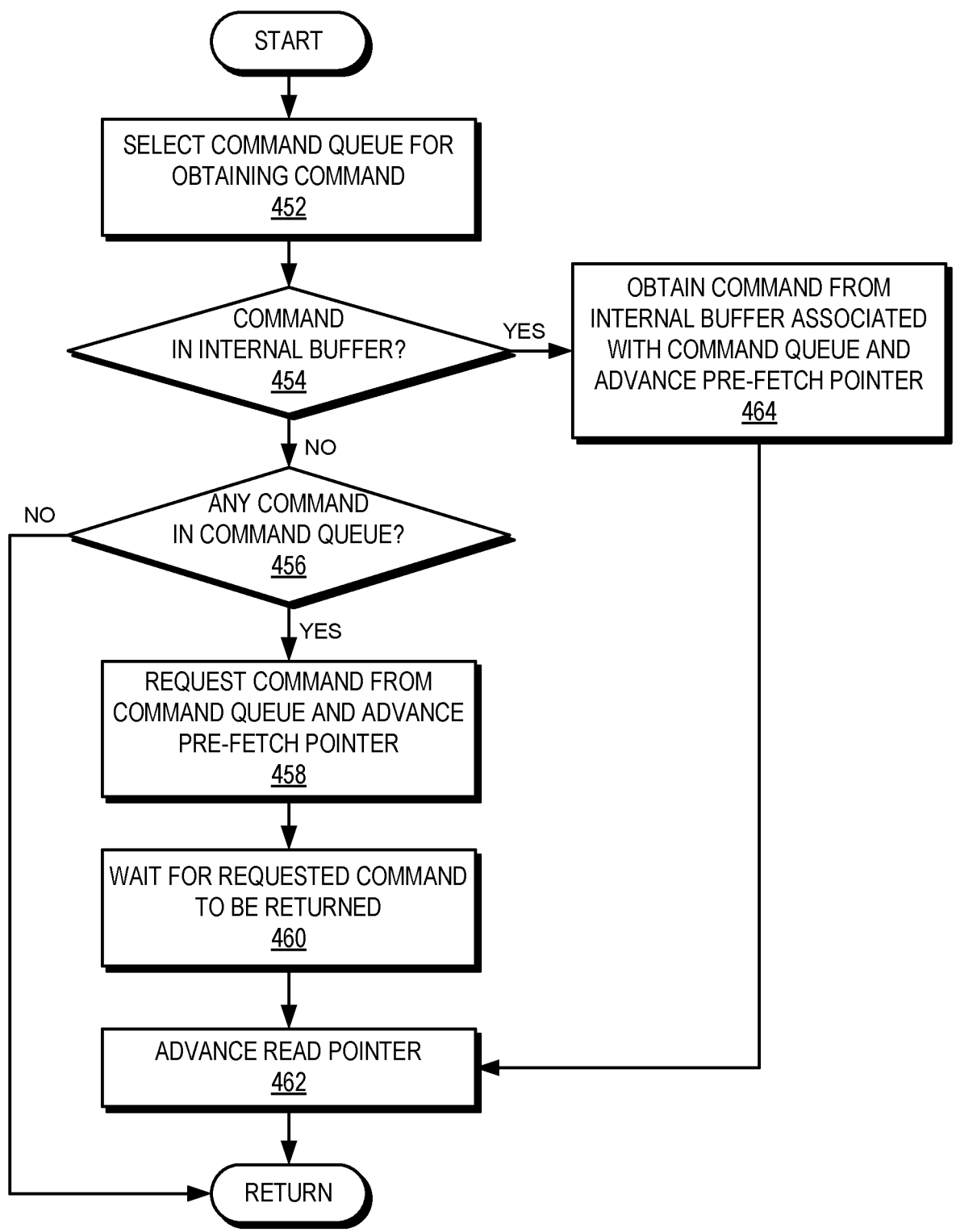
FIG. 4C shows a flow chart of a dynamic command management process of the memory-based command path in a NIC.

FIG. 4C shows a flow chart of a dynamic command management process of the memory-based command path in a NIC. During operation, the NIC can select a command queue for obtaining a command (e.g., based on an arbitration process) (operation 452) and check whether a corresponding internal buffer includes a command (operation 454). If the internal buffer does not include the command, the NIC can determine whether there is a command in the command queue (operation 456). If there is a command in the command queue, the NIC can request the command from the command queue and advance the pre-fetch pointer (operation 456).

The NIC can then wait for the requested command to be returned (operation 460). On the other hand, if the internal buffer includes the command, the NIC can obtain the command from the internal buffer associated with the command queue and advance the pre-fetch pointer (operation 464). Upon obtaining the command (operation 460 or 464), the NIC can advance the read pointer (operation 462).

Figure 4D:
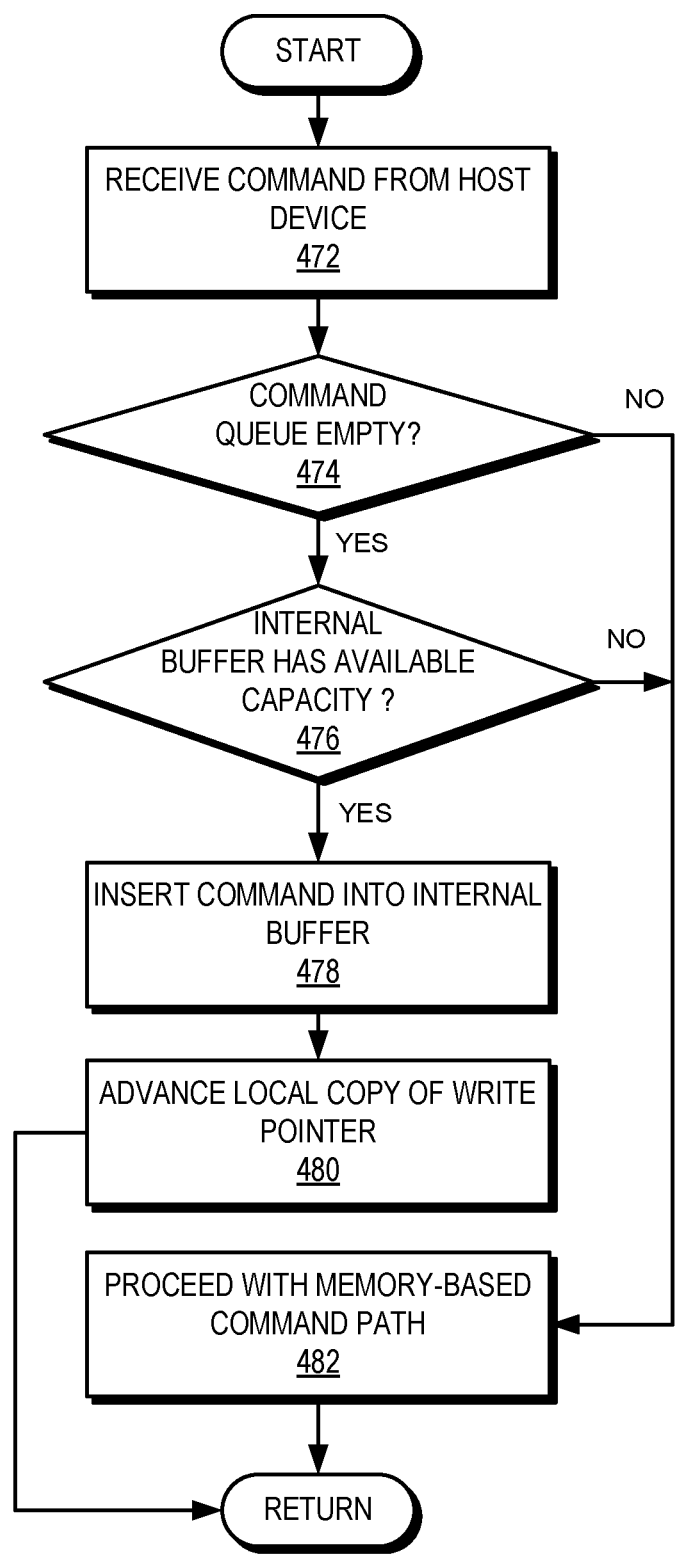
FIG. 4D shows a flow chart of a dynamic command management process of the low-latency command path in a NIC.

FIG. 4D shows a flow chart of a command management process of the low-latency command path in a NIC. During operation, the NIC can receive a command from the host device (operation 472) and determine whether the command queue is empty (operation 474). If the command queue is empty, the NIC can determine whether the internal buffer has available capacity to accommodate the received command (operation 476). If the internal buffer has available capacity, the NIC can insert the command into the internal buffer (operation 478) and advance the local copy (i.e., the copy of the NIC) of the write pointer (operation 480). On the other hand, if the command queue is not empty (operation 474) or the internal buffer does not have available capacity (operation 476), the NIC can proceed with the memory-based command path (operation 482).

Exemplary Computer System

Figure 5:
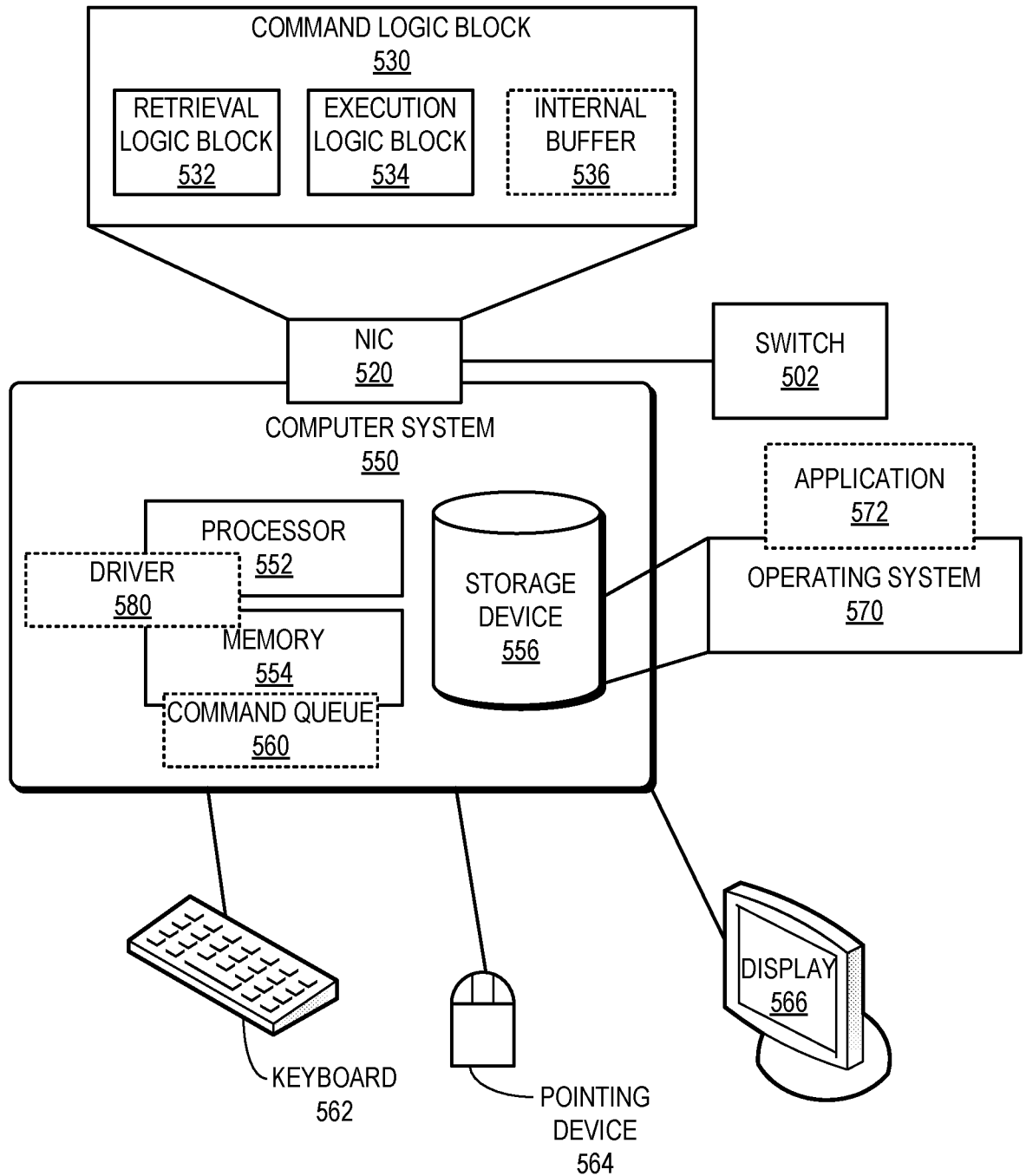
FIG. 5 shows an exemplary computer system equipped with a NIC that facilitates dynamic command management.

FIG. 5 shows an exemplary computer system equipped with a NIC that facilitates dynamic command management. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient command management. NIC 520 can provide one or more HNIs to computer system 550. NIC 520 can be coupled to a switch 502 via one of the HNIs. NIC 520 can include a command logic block 530, as described in conjunction with FIGS. 2B and 3. Command logic block 530 can include a retrieval logic block 532 and an execution logic block 534. Retrieval logic block 532 can provide information associated with the state of the command queue 560, as known by command logic block 530, to computer system 550 via the HI.

Device driver 580 of NIC 520 running on operating system 570 may select a command path based on the provided information. Driver 580 can dynamically determine whether to use the memory-based or low-latency command path based on the current state of a command queue 560 in memory device 554. Furthermore, driver 580 can speculatively determine that command queue 560 is likely to be empty and internal buffer 536 should have available capacity. Accordingly, NIC 520 can obtain a command from internal buffer 536 if possible. Otherwise, NIC 520 can obtain a command from command queue 560.

Retrieval logic block 532 can determine whether an internal buffer 536 of NIC 220 includes a command. If internal buffer 536 includes a command, retrieval logic block 532 can obtain the command from internal buffer 536. On the other hand, if internal buffer 536 does not include a command, retrieval logic block 532 can obtain a command from command queue 560 in memory device 554. In either case, retrieval module 532 can advance a pre-fetch pointer. Execution logic block 534 can execute the command. Execution logic block 534 can then advance a read pointer.

In summary, the present disclosure describes a NIC that facilitates efficient command management. The NIC can be equipped with a host interface, an arbitration logic block, and a command management logic block. During operation, the host interface can couple the NIC to a host device. The arbitration logic block can select a command queue of the host device for obtaining a command. The command management logic block can determine whether an internal buffer associated with the command queue includes a command. If the internal buffer includes the command, the command management logic block can obtain the command from the internal buffer. On the other hand, if the internal buffer is empty, the command management logic block can obtain the command from the command queue via the host interface.

The methods and processes described above can be performed by hardware logic blocks, modules, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC), comprising:
a host interface coupling a host device;
an arbitration logic block to select a command queue from a plurality of command queues of the host device for processing a command, wherein the command queue of the host device corresponds to an internal buffer of the NIC; and
a command management logic block to:
  determine whether the corresponding internal buffer includes a command which was previously transferred to the internal buffer via the host interface;
  in response to determining that the internal buffer does not include the command and that the command queue includes the command, obtain the command from the command queue via the host interface;
  in response to determining that the internal buffer includes the command, obtain the command from the internal buffer; and
  provide the host device with statistics associated with performance of the internal buffer, wherein the statistics are used to determine whether subsequent commands are to be transferred to the internal buffer.

2. The network interface controller of claim 1, wherein the command management logic block is further to provide the host device one or more of:
  processing information associated with the command queue; and
  state information comprising a read pointer of the command queue.

3. The network interface controller of claim 1, wherein the command management logic block is further to determine that the command queue has a new command based on an advancement of a write pointer of the command queue.

4. The network interface controller of claim 1, wherein the arbitration logic block is further to select the command queue from the plurality of command queues in a memory device of the host device based on an arbitration process among the command queues.

5. The network interface controller of claim 4, further comprising a corresponding internal buffer for a respective command queue.

6. The network interface controller of claim 1, wherein the command management logic block is further to drop a new command received from the host interface and destined for the internal buffer in response to determining one or more of:
  insufficient capacity in the internal buffer to accommodate the new command; and
  the command queue is not empty.

7. The network interface controller of claim 6, wherein, in response to receiving the new command, the command management logic block is further to advance a write pointer of the command queue, thereby determining a presence of a command in the command queue.

8. The network interface controller of claim 1, wherein the command management logic block is to:
  advance a pre-fetch pointer of the command queue in response to requesting the command; and
  advance a read pointer of the command queue in response to receiving data associated with the command.

9. The network interface controller of claim 1, wherein the host interface is a peripheral component interconnect express (PCIe) interface; and
  wherein the command management logic block is to obtain the command from the command queue based on a PCIe read.

10. The network interface controller of claim 1, wherein the command includes a remote direct memory access (RDMA) command.

11. A computer system for facilitating a command management system, comprising:
  a processor;
  a memory device storing a plurality of command queues;
  a host interface to couple a network interface controller (NIC), which maintains an internal buffer corresponding to a command queue; and
  a storage device storing instructions which when executed by the processor cause the processor to perform a method, the method comprising:
    writing a command to the command queue;
    obtaining statistics associated with one or more of:
      performance of the internal buffer; whether the command queue is expected to be empty; and current locations of one or more pointers of the command queue;
    determining, based on state of the command queue and the obtained statistics, whether the internal buffer accepts the command;
    in response to determining that the internal buffer accepts the command, writing, via the host interface, the command into the internal buffer;
    in response to determining that the internal buffer does not accept the command, informing the NIC, via the host interface, that the command has been written into the command queue.

12. The computer system of claim 11, wherein the state of the command queue indicates whether the command queue is empty.

13. The computer system of claim 11, wherein the method further comprises:
  speculatively determining, based on the obtained statistics, whether the command queue is expected to be empty.

14. The computer system of claim 11, wherein informing the NIC further comprises advancing a write pointer of the command queue.

15. The computer system of claim 11, wherein the method further comprises:
  writing a plurality of commands into the command queue based on a granularity of allowed writes into the command queue; and
  advancing a write pointer of the command queue according to the granularity.

16. The computer system of claim 11, wherein the method further comprises, in response to determining that the internal buffer cannot accept the command, selecting the command in the command queue as a backup command.

17. The computer system of claim 16,
  wherein the NIC obtains the command from the command queue via the host interface in response to determining that the command has been dropped at the internal buffer.

18. The computer system of claim 11, wherein the host interface is a peripheral component interconnect express (PCIe) interface; and
  wherein the command is written into the internal buffer based on a PCIe write.

19. The computer system of claim 11, wherein the command includes a remote direct memory access (RDMA) command.

20. The network interface controller of claim 1,
  wherein the internal buffer is of a fixed size and can store a limited number of commands.

* * * * *